United States Patent
Crawford

(10) Patent No.: US 10,895,640 B2
(45) Date of Patent: Jan. 19, 2021

(54) DIGITAL ACTIVE OPTICAL TARGET DETECTION SYSTEM

(71) Applicant: Raytheon Company, Waltham, MA (US)

(72) Inventor: John Okerson Crawford, Vail, AZ (US)

(73) Assignee: Raytheon Company, Waltham, MA (US)

( * ) Notice: Subject to any disclaimer, the term of this patent is extended or adjusted under 35 U.S.C. 154(b) by 347 days.

(21) Appl. No.: 15/964,579

(22) Filed: Apr. 27, 2018

(65) Prior Publication Data

US 2019/0331795 A1   Oct. 31, 2019

(51) Int. Cl.
*G01S 17/04*   (2020.01)
*F42C 13/02*   (2006.01)
*G01S 7/481*   (2006.01)

(52) U.S. Cl.
CPC ............ *G01S 17/04* (2020.01); *F42C 13/023* (2013.01); *G01S 7/4811* (2013.01)

(58) Field of Classification Search
CPC ...... G01S 17/14; G01S 7/4865; G01S 7/4861; G01S 7/4863
See application file for complete search history.

(56) References Cited

U.S. PATENT DOCUMENTS

| | | | |
|---|---|---|---|
| 4,819,561 A | 4/1989 | Born et al. | |
| 5,323,987 A | 6/1994 | Pinson | |
| 6,111,241 A | 8/2000 | English et al. | |
| 6,163,372 A | 12/2000 | Sallee et al. | |
| 6,323,942 B1 | 11/2001 | Bamji | |

(Continued)

FOREIGN PATENT DOCUMENTS

| | | | |
|---|---|---|---|
| GB | 2039445 | 8/1980 | |
| GB | 2280734 | 2/1995 | |
| GB | 8510124 | * 8/1995 | ............. F24C 13/02 |

OTHER PUBLICATIONS

Kenneth I. Schultz, et al., Digital-Pixel Focal Plan Array Technology, Lincoln Laboratory Journal, Nov. 2, 2014,36 pp. 36-51, vol. 20.

(Continued)

*Primary Examiner* — Luke D Ratcliffe
(74) *Attorney, Agent, or Firm* — Renner, Otto, Boisselle & Sklar, LLP

(57) ABSTRACT

Provided is a detection system that utilizes high dynamic range, monolithically arranged, digital pixel sensors for situational awareness, targeting, tracking or locating. The detection system transmits a radially outwardly directed set of laser pulses into an environment, aspects of the pulses being reflected back by environmental elements to a single pixel array. The single pixel array scans volumetric space proximate the environment for profile characterization of the reflected aspects by the detection system in terms of intensity and multiplicity. The detection system is configured to compare this profile against a library of profiles of known environmental elements to distinguish between the environmental elements and a target. The detection system may be disposed about an outer periphery of a projectile for use in determining when the projectile is proximate the target for triggering an actionable element of the projectile, such as an initiator fuze for an explosive system.

20 Claims, 6 Drawing Sheets

(56) References Cited

U.S. PATENT DOCUMENTS

| | | |
|---|---|---|
| 6,665,063 B2 | 12/2003 | Jamieson et al. |
| 6,740,879 B1 | 5/2004 | Tenhet, Jr. et al. |
| 7,206,062 B2 | 4/2007 | Asbrock et al. |
| 8,022,350 B2 | 9/2011 | Ackland |
| 8,757,064 B2 | 6/2014 | Jennings et al. |
| 8,842,015 B2 | 9/2014 | Scott |
| 9,086,488 B2 | 7/2015 | Tchoryk, Jr. et al. |
| 9,274,203 B1 | 3/2016 | Yap et al. |
| 9,753,126 B2 | 9/2017 | Smits |
| 2012/0248288 A1 | 10/2012 | Linder et al. |
| 2019/0154812 A1* | 5/2019 | Meng .................... G01S 17/14 |

OTHER PUBLICATIONS

International Search Report and Written Opinion for corresponding International Application No. PCT/US2018/067637 dated Mar. 20, 2019.

* cited by examiner

DIGITAL ACTIVE OPTICAL TARGET DETECTION SYSTEM

FIELD OF THE INVENTION

The invention relates generally to a detection system for analyzing an environment about the detection system during movement of the detection system through the environment, and more particularly to a movable projectile having a target detection system for analyzing an environment about the projectile during its movement through the environment to determine proximity of the projectile to a target and thereby to activate an actionable element.

DESCRIPTION OF THE RELATED ART

When moving through a three-dimensional environment, a target detection system may encounter various interferrents, which may include aerosols and moving or non-moving objects. Conventional sensor systems, such as those for use on a projectile, often can distinguish between a target and other solid objects but encounter difficulty distinguishing between aerosols, such as those having particles spaced together in a volume, and a denser volume of a target. Such system also can be frustrated by reflections, such as from a liquid or other reflective surface, when imaging targets of a temperature different than a background, or when distinguishing between interlaid elements, such as a target within a smoke or cloud volume. Conventional sensor systems typically saturate or have increased noise in such situations and provide a premature signal due to awaiting for the sensor to indicate the attainment of a single threshold, such as an energy level of a returned beam of light.

SUMMARY OF THE INVENTION

The present disclosure provides a detection system that overcomes one or more of these deficiencies of conventional sensor systems. The detection system is not dependent on formation of an image in a 2D plane by an array of a plurality of pixels or on the attainment of one or more thresholds, and thus is not affected by saturation or a single false returned energy signature caused by an aerosol reflection, for example. Rather the detection system is configured to build a profile of the environment proximate the detection system based on a plurality of reflected energy signatures received at a single pixel array.

The present disclosure provides a detection system that utilizes high dynamic range, monolithically arranged, digital pixel sensors for situational awareness, targeting, tracking or locating. The detection system transmits a radially outwardly directed set of laser pulses into an environment, aspects of the pulses being reflected back by environmental elements to a single pixel array. The single pixel array scans volumetric space proximate the environment for profile characterization of the reflected aspects by the detection system in terms of intensity and multiplicity. The detection system is configured to compare this profile against a library of profiles of known environmental elements to distinguish between the environmental elements and a target. The detection system may be disposed about an outer periphery of a projectile for use in determining when the projectile is proximate the target for triggering an actionable element of the projectile, such as an initiator fuze for an explosive system.

According to one aspect of the present invention, a detection system is provided for analyzing an environment about the detection system during movement of the detection system along a flight path through the environment. The detection system includes a laser light assembly that transmits temporally spaced pulses of light outwardly from the detection system; an optical detector that receives photonic energy of the transmitted light reflected back towards the detection system by the environment and that converts the photonic energy to electrical energy, a charge storage architecture that receives and stores the converted electrical energy, and a charge reading architecture that digitizes the electrical energy stored at the charge storage architecture and transmits data regarding an energy level of the stored energy, wherein the electrical energy is digitized in a plurality of samples per emission of each pulse of light from the laser light assembly. A controller receives digitized data from the charge reading architecture and analyzes said data, wherein the controller compiles a profile of the environment about the detection system including the measurements of the electrical energy from the analyses versus the time elements, and compares the compiled profile against predetermined profiles of environmental elements to enable recognition of the environmental elements by the detection system, and wherein the controller is configured to output a target declaration signal upon recognition of a pre-determined environmental element.

The optical detector may be a single pixel of a 1-by-1 array.

At least the optical detector, the charge storage architecture, the charge reading architecture, and the controller may be monolithically arranged as a single integrated component.

The plurality of samples digitized per emission by the charge reading architecture may be at least tens of samples per emission.

The charge reading architecture may be configured to digitize each of the plurality of samples at least a factor of 10,000 times faster than the duration of an interval between signals sent by the controller to trigger subsequent emissions of light from the laser light assembly.

The charge reading architecture may be configured such that a digitization speed of each sample of the plurality of samples is less than five nanoseconds.

Each emission of the light transmitted by the laser light assembly may be directed perpendicularly outwardly from the direction of movement in a fan-shaped pulse.

The detection system may further include a temporal filter tuned to provide a signal in response to a change in energy level received to facilitate detection of a leading edge of the signal released from the charge storage architecture.

The detection system may further include a memory that stores the predetermined profiles of environmental elements, the profiles including measurements of electrical energy received versus time of digitization along a respective flight path.

The laser light assembly may be configured to transmit the temporally spaced pulses of light in a direction transverse a direction of movement of the detection system through the environment.

A movable projectile may include a fuselage, a motor coupled to the fuselage for driving movement of the fuselage through an environment, the fuselage extending along a central longitudinal axis of the projectile, an actionable element for being activated upon proximity of the projectile to a target located within the environment, a projectile controller directing activation of the actionable element, and a target detector array including a plurality of the detection systems communicatively coupled to the projectile controller and configured to detect the target and to output a signal to cause the activation of the actionable element upon the proximity of the projectile to the target, the detection systems positioned circumferentially about a periphery of the projectile and about the central longitudinal axis of the projectile, each of the detection systems wherein the respective controller is a detector controller that is configured to output the target declaration signal upon recognition of the target being the pre-determined environmental element, to cause the projectile controller to activate the actionable element.

The light transmitted by the respective laser light assemblies may be directed perpendicularly outwardly from the central longitudinal axis of the projectile.

The plurality of detection systems may be circumferentially positioned in an arrangement circumferentially spaced from one another to prevent overlap of the transmitted light pulses, which are fan-shaped light pulses, in a predefined space about the projectile.

The actionable element may be a warhead initiation fuze coupled to a warhead that is coupled to the fuselage.

According to another aspect of the invention, a detection system is provided for analyzing an environment about the detection system during movement of the detection system along a flight path through the environment. The detection system includes a laser light assembly that transmits temporally spaced pulses of light outwardly from the detection system, said pulses transiting a radial area of space during each emission period of each discrete pulse of light, an optical detector that receives photonic energy of the transmitted light reflected back towards the detection system by the environment and that converts the photonic energy to electrical energy, a charge storage architecture that receives and stores the converted electrical energy, a charge reading architecture that digitizes the electrical energy stored at the charge storage architecture and transmits data regarding an energy level of the stored energy, wherein the electrical energy is digitized at a rate of a plurality of tens of samples per each emission period, wherein a digitization speed of each sample of the plurality of samples is less than five nanoseconds, and a controller that receives digitized data from the charge reading architecture and analyzes said data to determine proximity of the detection system to a pre-determined environmental element.

The controller may be configured during the analysis to compare said data against a plurality of pre-defined profiles including measurements of electrical energy received versus time of digitization along a respective flight path, wherein the controller may be configured to output a target declaration signal upon recognition of the pre-determined environmental element.

A digitization speed of each sample of the plurality of samples may be less than two nanoseconds.

The charge reading architecture may be configured to digitize each of the plurality of samples at least a factor of 10,000 times to 30,000 times faster than the duration of an interval between signals sent by the controller to trigger subsequent emissions of light from the laser light assembly.

The charge reading architecture may be configured to digitize 30 to 50 samples per emission period.

The laser light assembly may be configured to transmit the temporally spaced pulses of light in a direction transverse a direction of movement of the detection system through the environment.

According to yet another aspect of the invention, a detection system is provided for analyzing an environment about the detection system during movement of the detection system through the environment along a flight path. The detection system includes a laser light assembly that transmits temporally spaced fan-shaped pulses of light outwardly from the detection system, and a monolithically arranged optical circuit having a body including a single pixel of a 1-by-1 array, a charge storage well, a comparator or an A-to-D converter, and a controller, wherein the optical circuit is configured to receive photonic energy of the transmitted light reflected back towards the detection system by the environment and that converts the photonic energy to electrical energy, wherein the charge storage well receives and stores the converted electrical energy, and wherein the comparator or the A-to-D converter digitizes the electrical energy stored in the charge storage well and transmits data regarding the electrical energy level of the electrical energy received into the charge storage well. The controller is configured to compile a profile of the environment about the detection system including the measurements of the electrical energy from the analyses versus times of digitization along the flight path of the respective electrical energy. The controller is configured to compare the compiled profile against the predetermined profiles of environmental elements to enable recognition of the environmental elements by the detection system. The controller is configured to output a target declaration signal upon recognition of a pre-determined environmental element.

The optical circuit may include a plurality of comparators each configured to provide a signal to the controller upon detection of a different electrical energy level at the energy storage well.

The laser light assembly may be configured to transmit the temporally spaced pulses of light in a direction transverse a direction of movement of the detection system through the environment.

BRIEF DESCRIPTION OF DRAWINGS

The annexed drawings, which are not necessarily to scale, show various aspects of the disclosure, some of which may be shown schematically.

DETAILED DESCRIPTION

Figure 1:
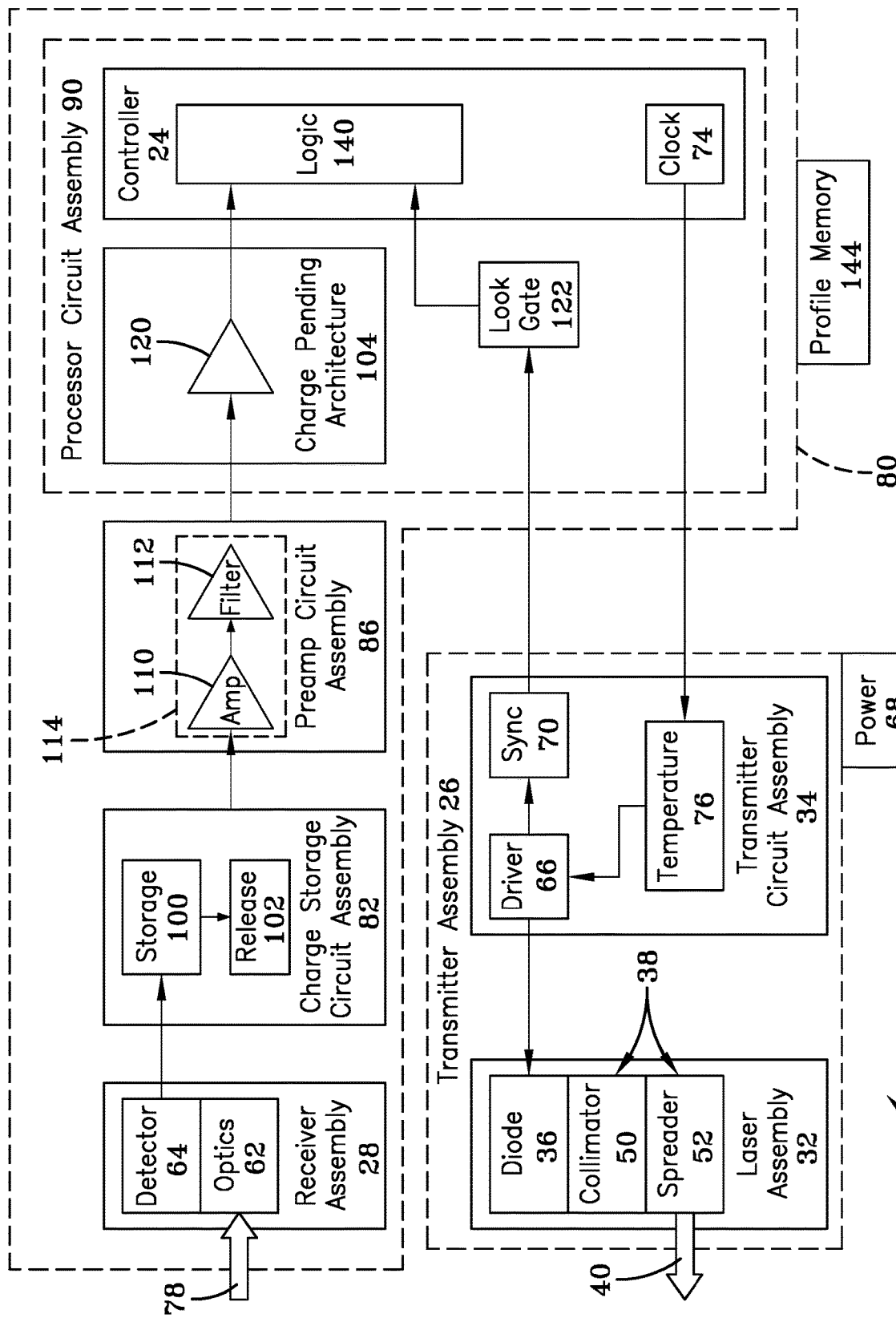
FIG. 1 is a schematic illustration of an exemplary detection system according to the present invention.

The present invention provides a detection system for analyzing an environment about the detection system, such as during movement of the detection system through the environment. Likewise, the detection system may be stationary and detect environmental elements moving past the detection system.

The detection system generally is configured to transmit and receive pulses of energy for the purpose of compiling a profile of environmental elements, such as those being passed by a detection system in transit. The profiles are functions of intensity of energy received versus a time element, such as a time of digitization along a respective flight path, for example. Pulse energy received may include multiplicities of pulse signatures, and a plurality of pulses per energy emission may be analyzed in concert for developing the aforesaid profile, the detection system being configured to compare the profiles against a library of known profiles to distinguish between environmental elements and a target being hunted, for example. The detection system is configured to develop the profiles using single pixels, such as in a 1-by-1 array. Because of the profiling of energy levels and number of digitizations per energy emission, the detection system does not require spatial resolution or development of an image such as in a 2D or 3D array for analysis of the environment. The quantity of energy data received is not sufficient for purposes of mapping the environment proximate or around the detection system.

In addition to detecting targets, the detection system is configured to not false-trigger on non-target interferrents analyzed in the environment proximate the detection system. The detection system is capable of distinguishing airborne scattering media, including aerosols, from a denser target. The airborne scattering media may include dust, rain, snow, water vapor, fog, oil fog, exhaust, smoke, etc. Other interferrents can include chaff, flying animals, etc. Via calibration and training of a controller of the detection system, the detection system can recognize these interferrents and distinguish them from true targets. Due to differences in the time elements (such as digitization times), multiplicities, and energy levels of the returned pulses of targets and interferrents, the detection system also can detect the presence of a target inside an interferrent.

In an example, the detection system may be included in a projectile configured to travel at high speeds, such as a missile, for determining when the missile is proximate a target for the purpose of initiating an explosive fuse. The detection system may be used with a variety of projectiles, or alternatively with a flying object such as a high-speed drone or hypersonic UAV. In one example, the detection system may be used as an active optical target detector (AOTD) for proximity detection of targets that have not been impacted directly by a missile or other flying weapon, but which are still within lethal range. By detecting these targets, and triggering a warhead within this range, the target may be destroyed even if the missile misses its target. While the detection system is discussed herein with respect to such a projectile, it will be appreciated that the detection system also may be used as a stationary system, such as for determining when a target passes by or is approaching the detection system.

Generally, the detection system according to the present invention sweeps the space in proximity to the detection system by virtue of movement of one of the detection system or environmental elements in the space relative to one another, but typically with respect to a moving detection system. The sweeping is conducted via a plurality of pulses, which may be provided in the form of one or more, such as an array, of fan-shaped laser beams.

With reference now to FIG. 1, a detection system 22 is schematically illustrated and includes a controller 24, a transmitter assembly 26, and a receiver assembly 28.

It is appreciated that the schematic illustration is but one arrangement of components suitable for enabling distinguishing of a target from environmental elements proximate or disposed about the detection system 22. Other arrangements may be suitable. Other arrangements may include additional or alternative components or may omit one or more components illustrated in FIG. 1.

The illustrated transmitter assembly 26 includes a laser assembly 32 and a laser transmitter circuit assembly 34. The laser assembly 32 includes a diode component 36, also referred to as a laser light source 36, which may be a laser diode or a diode pumped microchip assembly, for example, that is configured to emit a laser beam. The light may be provided having a red color, for example having a wavelength in the range of about 620 nm to about 750 nm, or about 660 nm to about 710 nm, or about 660 nm. Alternatively, the laser light source 36 may provide light having an ultraviolet color.

The laser light source 36 is configured to transmit temporally spaced pulses of light outwardly from the detection system 20, via control of the controller 24. For example, the laser light assembly 32 may be arranged to transmit laser light pulses 40 in a direction transverse a direction of movement of the detection system 20 through the surrounding environment, such as orthogonal to the direction of movement. In other embodiments, the laser light assembly 32 may be arranged to transmit laser light pulses 40 parallel to or in a direction of movement.

The controller 24 and laser assembly 32 are configured to emit pulses 40, such as with a duration of about 1 nanosecond to about 5 nanoseconds for example, or such as about 2 nanoseconds. The controller 24 and the laser assembly 32 also are configured to control the pulse repetition period, or interval between the signals sent by the controller 24 to trigger subsequent emissions of light from the laser light assembly 32. The pulse repetition interval may be in the range of about 30 microseconds (30,000 nanoseconds) to about 70 microseconds (70,000 nanoseconds), or about 40 microseconds (40,000 nanoseconds) to about 60 microseconds (60,000 nanoseconds), or about 50 microseconds (50,000 nanoseconds).

The laser assembly 32 further includes light directing elements 38 for directing the light from the laser light source 36 into a fan-shaped beam 40. The light initially transmitted from the laser light source 36 may be optically formed by any suitable light directing elements 38. For example, a collimater or collimating lens 50 may initially collimate the initial beam of light, with the light then being directed to a spreader lens 52 to spread the collimated beam into the fan-shaped, 90-degree section of light 40. In this manner, the light is able to be directed towards about a quarter of the space disposed circumferentially about the detection system 22. The laser light source 36 and the light directing elements 38 may be jointly configured to direct the beam 40 a distance of about 3 meters to about 25 meters, or about 10 meters to about 20 meters, or about 15 meters from the laser assembly 32.

Figure 2:
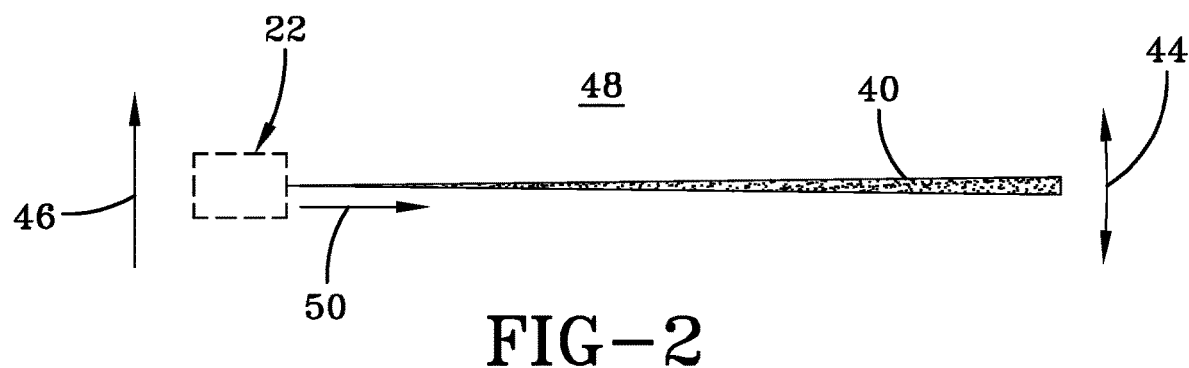
FIG. 2 is a side view of the exemplary detection system of FIG. 1 transmitting a laser pulse.
Figure 3:
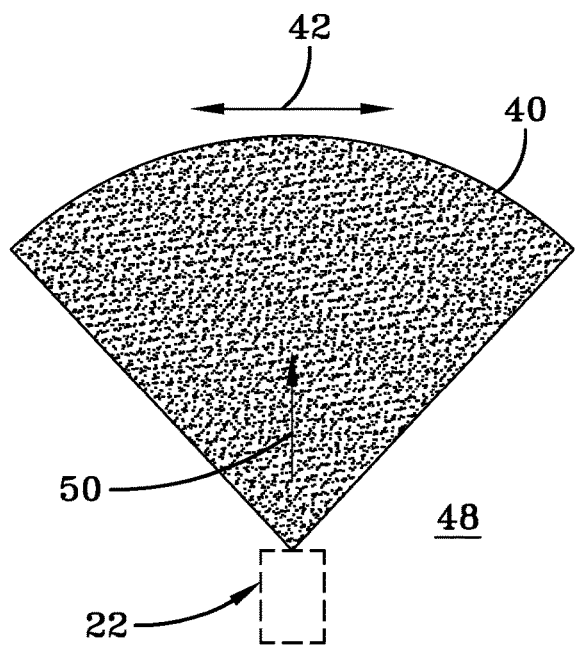
FIG. 3 is a front view of the exemplary detection system of FIG. 1 transmitting a laser pulse.

Turning briefly to FIGS. 2 and 3, the fan-shaped beam 40 is thus released from the laser assembly 32 with a much greater width dimension 42 than thickness dimension 44. The laser assembly 32 is preferably arranged to provide the smallest dimension, the thickness dimension 44 of the fan-shaped beam 40, aligned in the direction of movement 46 of the detection system 20 through the environment 48.

The fan-shaped beam 40 is thus aligned with the fan expanding angularly outwardly from the laser assembly 32 in a direction orthogonal to the direction of movement 46 of the detection system 20, and also orthogonal to the transmission direction 50 of light transmitted directly outwardly from the laser light source 36. The fan-shaped beam 40 defines a segment of light that preferably approximately covers 90-degrees of space about the detection system 22.

The laser transmitter circuit assembly 34 provides a portion of control of the laser assembly 32. A laser diode driver 66 is coupled to the laser light source 36 to provide and control necessary current from a power source 68, such as a battery coupled to the transmitter assembly 26. The laser pulse may be initiated via control of the controller 24.

A clock 74 of the controller 24 is coupled to the laser diode driver 66 for signaling initiation of emission of light from the laser light source 36, which initiation may occur delayed from the initial triggers signal sent by the controller 24. For example, the delay may be within a range of about 1 picosecond to about 10 picoseconds, or such as about 5 picoseconds, from receipt of direction from the controller 24. The delay may be referred to as the trigger period, or period from receipt of the trigger signal until actual emission of light.

It will be appreciated that the power source 68 may power each of the receiver assembly 30 and controller 24, or alternatively that a separate power source may be included or provided separate from the detection system 22. Likewise, the power source 68 may be a part not integrated with, but instead separate from, the detection system 22.

The controller 24 is further integrated with the laser transmitter circuit assembly 34 in that the controller 24 also may be coupled to a temperature controlling component of the laser transmitter circuit assembly 34, such as a temperature compensated laser drive 76. The temperature compensated laser drive 76 is configured to control the temperature of at least the laser assembly 32 of the transmitter assembly 26 and to maintain temperature within the specified limits. This control enables creation of pulses of light having equivalent wavelength, power, and consistency, regardless of temperature of the surrounding environment. The temperature compensated laser drive 76 may include one or both of a heater or thermos-electric cooler, for example. The clock 74 may be coupled to the temperature compensated laser drive 76 and upon recognition of the laser assembly 32 being at a pre-specified temperature, the clock 74 may send the signal to the laser diode driver 66 to initiate the respective laser pulse from the laser assembly 32.

A sync 70 is coupled to the laser diode driver 66 to provide a signal to the controller 24 when the laser has been fired, ending the trigger period of delay, thus starting a counter for a propagation time interval related to analysis of photonic energy received back from the environment in response to the initiated, emitted laser pulse. For example, the sync 70 detects a portion of the initial emission and sends a signal to the controller 24 to start the counter.

The receiver assembly 28 is configured to receive one or more reflected pulses 78 of light reflected from the environment from the plurality of pulses 40 of light transmitted initially by the laser assembly 32 of the transmitter assembly 26. Generally, the receiver assembly 28 contains optics 62 to collect light reflected by environmental elements irradiated by the laser emissions of the laser assembly 32 and to relay the received pulses 78 of light (one or more) to an optical detector 64 configured to work at the chosen laser wavelength, converting the incoming photonic energy to electronic form.

The optics 62 may include any suitable optical componentry configured to generate a photo-current in response to light impinging thereon, such as a photo-diode known to those of ordinary skill in the art. The optics 62 are coupled to the optical detector 64 for transmitting received photonic energy to the optical detector 64.

The optical detector 64, also referred to as a detector, is preferably an individually acting, or single detector 64, and preferably a single pixel cell in a 1-by-1 array. In this way, the single optical detector 64 is not combining input of one or more additional pixels that may be included in the respective detection system 22 to map a 2D or 3D image. Rather the detection system 22 is configured to individually analyze the received photonic energy from the single detector 64. Specifically, the optical detector 64 is configured to receive and to convert the photonic energy received into electrical energy.

In other embodiments, additional single pixel, 1-by-1 arrays may be included in a single detection system, with each acting independently of one another.

The depicted individual optical detector 64 itself is coupled to additional architecture necessary to provide the functions of amplification, filtering and digitizing of the electronic signal converted by the optical detector 64. In the preferred depicted embodiment of FIG. 1, the optical detector 64 is integrated into a readout integrated circuit (ROIC) architecture 80 that provides the functions necessary to amplify, filter, and digitize the electronic signal in an integrated package. The integrated package of additional amplification, filtering, and digitization components may be integrated into one component 80 with the optical detector 64, such as using semiconductor fabrication techniques.

Accordingly, the detection system 22 provides an integrated ROIC architecture 80, also herein referred to as an optical circuit, that is in a class of pixel circuits called "digital pixels" or "in-pixel ADCs." In this configuration, the digital pixel provides analog-to-digital conversion of the returned signals. Due to the close proximity of the electronic and photonic components, the colocation typically permits faster operating cycles. Particularly, the monolithic component or integrated ROIC architecture 80 allows for rapid digitization of electrical signals received as compared to, for example, arrays of increased size requiring alignment of respective clock edges to allow for accurate data analysis. Other technical advantages provided by aspects and embodiments of such digital pixels may include improved feasibility, dynamic range, cost, performance, noise performance, and power consumption for a given pixel size relative to conventional architectures, such as analog pixel optical receivers otherwise coupled to amplification, filtering and digitization components.

The ROIC architecture 80 is generally configured to accumulate charge converted from the optical detector 64, to integrate the charge, and to produce a voltage over a given time interval, which is herein referred to as a pulse integration interval. The pulse integration interval is generally temporally defined at front end by the initiation of the laser pulse 40 from the laser assembly 32 as indicated by a digital counter 70 coupled to the optical detector 64. A pulse integration interval may have a predefined end point from the initiation of the laser pulse 40, for cutting off analysis of the received photonic energy, also as controlled by the digital counter 70.

As will now be described in detail, the ROIC architecture 80 includes the receiver assembly 30 and the controller 24. A charge storage circuit assembly 82 is provided to store and release charge of the converted electrical energy output by the optical detector 64. A preamp circuit assembly 86 is provided to amplify and filter the electronic signal output by the receiver assembly 30. A processor circuit assembly 90 includes the controller 24 and provides the quantization, digitization and logic components of the ROIC architecture 80 for controlling the compilation of the profiles of the environment disposed about the detection system 22 in view of the differences in the times, multiplicities, and energy levels of the returned pulses 78 from targets and interferrents in the environment.

Now with reference to the charge storage circuit assembly 82, included is a charge storage architecture 100 and a charge release architecture 102. The charge storage architecture 100 includes a capacitive component, such as a capacitor, also referred to as a storage well, that receives and stores the converted electrical energy received from the optical circuit 64 of the receiver assembly 30. This well can be a deep well such as for storing about 10,000 electrons to about 50,000 electrons, or about 30,000 electrons, for example. The well may be shallow well for storing about 100 to about 5,000 electrons, or about 1,000 electrons, for example. Or, the well may have any suitable capacity such as in the range of about 50,000 electrons to about 500 electrons, or in the range of about 30,000 electrons to about 1,000 electrons, or about 15,000 electrons, for example.

In some embodiments, a plurality of wells may be coupled to the optical detector 64, such as where the wells are each shallow storage wells that may be filled and released of charge more quickly than deep wells. The charge storage architecture 100 may be coupled to each of the optical detector 64 and a charge reading architecture 104 of the processor circuit assembly 90 such as by noise reducing components, such as a low noise MOSFET switch, which can be used to isolate the well.

The charge release architecture 102 includes suitable components, such as a MOSFET, for removing all or a portion of the charge accumulated in the charge storage architecture 100. In this way, the effective amount of charge that is accumulated by the digital pixel/ROIC architecture 80, and thus enabled to be analyzed over an integration interval, may be increased.

The preamp circuit assembly 86 includes a gain amplifier 110 for amplifying the electrical signal released from the charge storage circuit assembly 82 for allowing for more efficient analysis by the processor circuit assembly 90. Also included is a filter 112 that may be tuned to provide a higher electrical signal value in response to a change of level to facilitate more precise time analysis of a leading edge of a signal received by the optical detector 64. In one embodiment, the amplifier 110 and filter 112 may each be aspects of a transimpedance amplifier 114, tuned to provide a signal in response to a change in energy level received to facilitate detection of a leading edge of the signal released from the charge storage architecture 100.

The processor circuit assembly 90 receives the electrical signals from the charge storage circuit assembly 82 and the preamp circuit assembly 86. Generally, the processor circuit assembly 90 is configured to control initiation of the transmitter assembly 26 and to process signal data received from the receiver assembly 30 via the charge storage circuit assembly 82 and/or the preamp circuit assembly 86. The processor circuit assembly 90 includes a digitization element, such as a charge reading architecture 104, a look gate 122, and the controller 24.

The charge reading architecture 104 is configured to digitize the electrical signal stored at the charge storage architecture 100 and to transmit data regarding the energy level and time element related to receipt of the energy level at the optical circuit 80 to the controller 24 for further analysis. The charge reading architecture 104 may include a reading element 120, such as a comparator or an A to D converter. The comparator may have a fixed or programmable reference voltage. The charge reading architecture 104 is configured to detect the charge of the associated charge storage architecture 100 and to directly or indirectly cause the charge release architecture 102 to empty the respective well, such as by shorting or release of the energy stored therein. The charge reading architecture 104 also may include a digital memory controller for aiding in digitizing the respective electrical signals.

The detection system 22 may include a digital counter included in, or separate from, any of the aforementioned assemblies or circuits, for recording quantity of charge removals. In such case, the type of digital counter used to record charge removals can be of any logical variation, including binary, gray code, Linear-Feedback-Shift-Register (LFSR), or any other digital count circuit that can count charge removals. Furthermore, the relative sign of the charge removal can be plus or minus, relative to circuit ground, so a charge removal could be viewed as a charge addition in some cases.

The charge reading architecture 104 is configured to digitize a plurality of samples per emission of each pulse 40 of light from the laser light assembly 32. The rapid digitization speed is enabled via the circuitry and monolithic nature of the ROIC architecture 80. Each sample may be digitized over a time period of about 5 nanoseconds to about 0.5 nanosecond, or about 4 nanoseconds to about 1 nanosecond or about 1 nanosecond.

In one example, an integration interval begins at a time of actual emission of a pulse 40, such as indicated by the sync 70, and ends a predetermined time thereafter, defining a predetermined integration interval over time per each emission/pulse 40. Such integration interval may have a length of time in the range of about 20 nanoseconds to about 60 nanoseconds, or about 30 nanoseconds to about 50 nanoseconds, or about 30 nanoseconds or about 50 nanoseconds, for example. Alternatively, the integration interval may be measured in terms of the number of samples digitized, where about 20 samples to about 60 samples are digitized per emission, or about 30 samples to about 50 samples, or about 30 samples, or about 50 samples. In one embodiment, where subsequent samples are digitized about each nanosecond, for example, the digitization frequency accordingly may be as high as about 1 GHz.

Typically, the same integration interval length per emission or the same number of samples digitized per emission is utilized to allow for accurate comparison of the plurality of digitized samples over the flight path of the detection system 20. Beyond such integration interval, useful data may not be obtained, and thus energy of and use of the ROIC architecture 80 may be wasted.

The controller 24 is coupled to each of the receiver assembly 30, transmitter assembly 26 and charge reading architecture 104. The controller 24 includes the clock 74, a detection logic 140, and in some embodiments also may include the charge reading architecture 104 integral therewith. The controller 24 may include a processor or any other suitable control hardware component such as an application specific integrated circuit, a programmable logic device, a memory device containing instructions, or the like.

The controller 24, also referred to as a detector controller 24, serves various purposes. For example, the controller 24 includes the clock 74 that aids in control of the transmitter circuit assembly 34 to control initiation of the laser diode driver 66. The controller 24 further includes the detection logic 140 that receives indication of initiation of the laser pulses from the laser assembly 32 via the look gate 122 of the processor circuit assembly 90. The controller 24 includes an internal memory (not specifically shown, but which may be included in the detection logic 140) that stores times of initiation of the pulses from the transmitter assembly 26. Likewise, in that the controller 24 is configured to receive the data from the charge reading architecture 104, the internal memory also may store such data.

From the stored data, the controller 24, via the detection logic 140, is configured to analyze the data related to transmission of pulses 40 and receipt of returned reflective pulses 78 a plurality of times per duration of each pulse 40 of light from the laser light source 36. The controller 24 compiles a profile, or a plurality of profiles, of the environment about the detection system 22 including the measurements of the electrical energy from the charge reading architecture 140 versus respective time elements. The time elements may include the time of sample digitization along the flight path, allowing for accurate spatial recognition of the environmental elements. Such time of digitization may one of the predetermined sampling interval, a time of crossing of a predetermined energy threshold of a comparator of the charge reading architecture 104 as compared against the time of initiation of the respective pulse, and/or may include a time of release of or shorting of energy from a well 110 of the charge storage architecture 100, such as where the charge reading architecture 104 or charge storage architecture 100 is configured to empty the charge storage architecture 100 upon maximum fill, for example.

In some embodiments, the controller 24 may be configured to continuously compile said profile. In other embodiments, the controller 24 may not continuously compile said profiles, but instead may compile at predetermined intervals, such as numerous times per second, or numerous times per emission of one or more laser pulses 40, for example.

The controller 24 via the detection logic 140, compares the compiled profiles against predetermined or stored profiles of environmental elements to enable recognition of the environmental elements by the detection system 22. The stored profiles may be stored in a profile memory 144 that is a part of or separate from the detection system 22. The stored profiles preferably include corresponding measurements of electrical energy signatures versus time elements.

Further, the controller 24 is configured to output a target declaration signal upon recognition of a pre-determined environmental element, such as a target. The target declaration signal may be output via wire or may be output wirelessly. Likewise, the controller 24 may access the library of stored profiles in a profile memory that is connected via wire or wireless means to the controller 24.

In the case of respective wireless transmissions or data transfers, a transmission element (not shown) may be included in or separate from the processor circuit assembly 90. The controller 24 may be configured to transmit data via any suitable network connection, such as cellular, WiFi, ethernet, Bluetooth, token ring, Zigbee, or the like.

Figure 4:
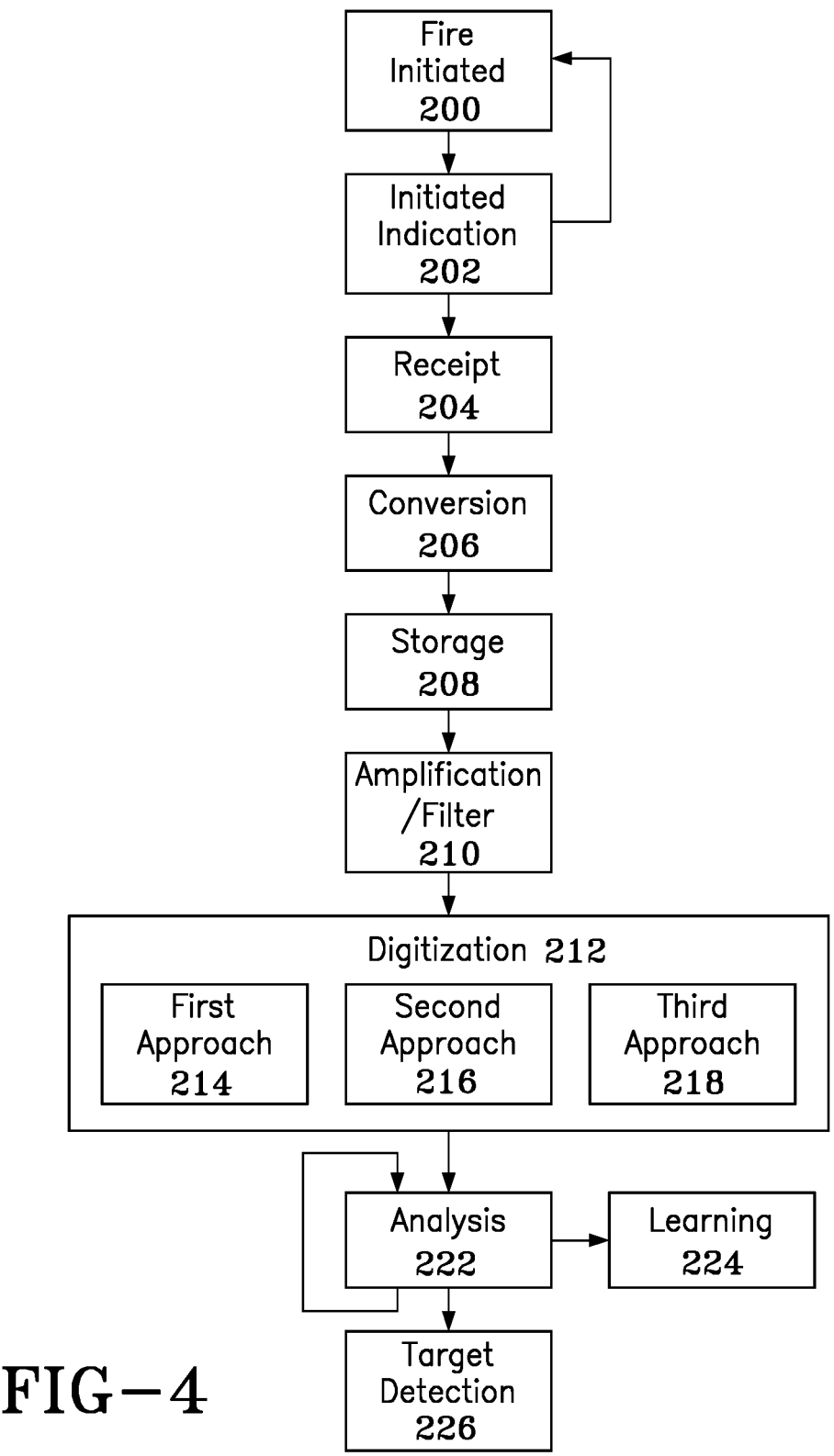
FIG. 4 is a schematic illustration of a method of analyzing a three-dimensional environment to distinguish a target from elements within the environment.

Turning now to FIG. 4, a method of analyzing an environment about the detection system 22 during movement of the detection system 22 through the environment is schematically illustrated. One of ordinary skill will recognize that such method also is applicable to use of a stationary detection system 22 analyzing passing environmental elements.

The method is illustrated as a series of blocks. However, the methodologies are not limited by the order of the blocks, as some blocks can occur in different orders or concurrently with other blocks from that shown or described, such as in parallel or in series with other blocks. Moreover, less than all of the illustrated blocks may be required to implement an example methodology. Furthermore, other methodologies can employ additional or alternative, non-illustrated blocks.

At block 200, the controller 24 directs the laser diode driver 66 to produce a current to fire the laser assembly 32. The transmitter assembly 26 is configured to fire the laser within picoseconds, such as within a range of about 1 picosecond to about 10 picoseconds, or such as about 5 picoseconds, from receipt of direction from the controller 24. At block 202, the trigger or delay period has ended, and the controller 24 receives indication from the sync 70 that the pulse 40 has been initiated, thereby starting the pulse duration. The pulse 40 may last on the order of about 1 nanosecond to about 5 nanoseconds for example, or such as about 2 nanoseconds.

Blocks 200 and 202 are repeated at pre-specified intervals. The controller 24 commands the respective transmitter assembly 26 to repeat the pulse 40 a predetermined number of times intervally spaced apart, such as according to the aforementioned pulse repetition interval with spacing between successive pulses 40 of a set of pulses being greater than or equal to the duration of any single pulse 40 and greater than the full sampling interval of the ROIC architecture 80. The laser pulses 40 are temporally brief, as aforedescribed, on the order of a nanosecond or less in duration each, and thus the transit of the laser pulse 40 and the return reflection(s) 78 at the speed of light is much less than the time between each successive pulse 40 of a set of pulses 40. It is noted that the pulse repetition interval may be between pulses 40 of the same detection system 22, or in a target detector array 20 including a plurality of target detection systems 22, the pulse repetition interval may be between pulses of different detection systems 22, where at least one of the detection systems 22 is not fired at the same time as at least one other of the detection systems 22.

In one embodiment, for example, where the charge reading architecture 104 is configured to digitize each of 50 samples over the predefined sampling interval, with each of the subsequent digitizations taking about 1 nanosecond, the complete digitizations or sampling interval may be on the order of about 50 nanoseconds. Comparatively, in the same embodiment, where the pulse repetition interval is 50,000 nanoseconds (50 microseconds) for example, the charge reading architecture 104 is thus configured to digitize each of the samples a factor of 50,000 times faster than the duration of the pulse repetition interval. In other embodiments, the controller 24 and the charge reading architecture 104 may be configured such that the charge reading architecture 104 digitizes each of the samples a factor of about 10,000 to about 60,000 times faster than the pulse repetition interval, or about 20,000 time to about 50,000 times faster, or about 30,000 times faster.

Figure 6:
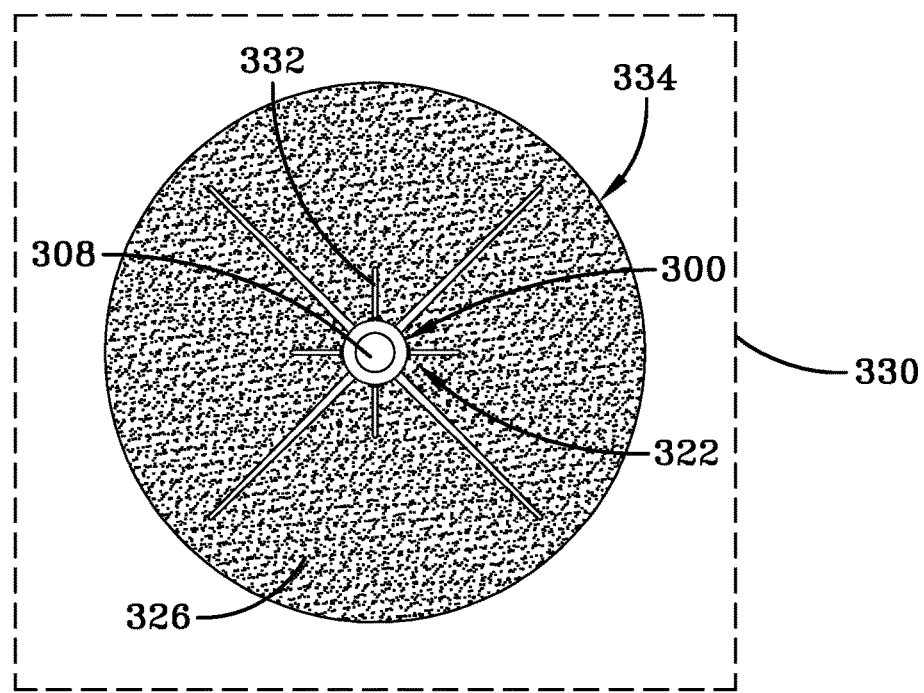
FIG. 6 is a front view of the projectile of FIG. 5.

In some examples, such as shown in FIG. 6, where the detection system 320 includes a plurality of detection systems 322 spaced apart from one another, detection systems 322 adjacent one another may not be fired simultaneously to avoid cross-talk. Instead the respective controllers of each of the detection systems 322 may control the various detection systems 322 to fire in a succession, or depending on arrangement, for opposing detection systems 322 to fire simultaneously, with adjacent detection systems 322 not firing until firing is complete from the initial detection systems 322.

At block 204, the receiver assembly 30 receives reflected pulses 78 of light that have reflected off of elements in the environment, such as interferrents or a target. At block 206, the optical detector 64 receives the photonic energy of the reflected pulses and converts the pulses into electrical energy signatures. Such signatures may have varying energy levels and may be received at various times. For example, laser light reflected off of moisture droplets may cause a plurality of temporally spaced apart returns of varying energy levels.

At block 208, the converted electrical energy is received at one or more storage wells of the charge storage architecture 100. At block 210, the preamp circuit assembly 86 receives the electrical signals from the receiver assembly 30 and may provide a signal in response to a change in energy level received to facilitate detection of a leading edge of the signal released from the charge storage architecture 100.

At block 212, one or more of a comparator, an A-to-D converter or a digital memory controller of the charge reading architecture 104 digitizes the electrical signal stored at the charge storage architecture 100 and transmits data regarding the energy level and time element to the controller 24 for further analysis. In connection with block 212, the charge reading architecture 104 may directly or indirectly cause the charge release architecture 102 to empty the respective well, such as by shorting or release of the energy stored therein.

Internal blocks 214, 216 and 218 represent various approaches to measurement of electrical signals received at and stored in the charge storage architecture 100 by the charge reading architecture 104. It will be appreciated that any of the first approach (block 214), second approach (block 216), and third approach (block 218) may be used. Where multiple detection systems 22 are included in a target detector array 20, one or more approaches may be used for different of the detection systems 22, such as at different times, although it is preferred that at least one same approach be used for each of the detection systems 22.

At block 214, the first approach includes the use of one or more shallow wells 100, such as aforedescribed. In this approach, a comparator 120 with a predetermined reference voltage detects the setpoint at the shallow charge well 100. When the set point is exceeded, the charge release architecture 102 is caused to briefly short the well to reset the well, and a digital counter is incremented. At a predetermined interval basis, such as about every nanosecond for about a 30 nanosecond to about a 50 nanosecond interval, the controller 24 reads and records the count from the digital counter. The number of counts is utilized as energy level data transmitted to the controller 24 by the charge reading architecture 104.

At block 216, the second approach includes the use of multiple comparators 120 that are programmed to simultaneously detect charge at several predetermined levels of interest at the well 100 of the charge circuit assembly 82. The comparators 120 may simultaneously digitize the electrical charge and transmit data to the controller 24 at a predetermined interval basis, such via the aforementioned sampling interval, such as about each nanosecond for a duration of about 30 to 50 nanoseconds, such as about 50 nanoseconds. The time of digitization of each comparator may be transmitted to the controller 24 as respective time elements.

At block 218, the third approach includes the use of two or more deep storage wells 100 as aforedescribed. Instead of use of a comparator, the charge reading architecture additionally or alternatively includes a local A-to-D converters 120 configured to read and to cause discharge of the deep storage wells 100, such as during the comparatively long time between laser pulses 40, or across many pulses 40. This approach requires parallel capacitive wells 100 of comparable size, switching between them so that reflected laser signal accumulation may be accomplished in an alternate well 100 while charge is read and digitized from at least one other well 100. It is appreciated that an A-to-D convertor may operate at speeds slower than a comparator.

At block 222, the detection logic element 140 of the controller 24 is configured to compile a profile of the environment, which may include one or more sub-profiles of environmental elements encountered, such as targets or interferrents. The profiles are functions of energy level of the one or more energy signatures received from each pulse transmitted and of time elements. The time elements may include time of receipt of the respective electrical energy at the optical circuit 80, time of accumulation of one or more predetermined energy levels, or time of digitization by the charge reading architecture 104 for example. By comparing the compiled profile to known profiles, the controller 24 can determine the presence of a target, and can distinguish a target from interferrents, ensuring that the detection system 22 does not receive a false detection of a target.

In some embodiments, at least a part of the analysis step 222 may take place at another assembly or circuit where suitable, such as where a logic element is included elsewhere in the respective target detector 22.

At block 224 the controller 24, such as the detection logic element 140, may be configured to compile new environmental profiles of interferrents, for example, not yet in the library accessed by the detection logic element 140. Such new profiles may be stored in the internal memory of the controller 24, or instead may be written to the external memory 144.

At block 226, the controller 24 outputs a target declaration signal upon detection of a known or predetermined target profile.

Figure 5:
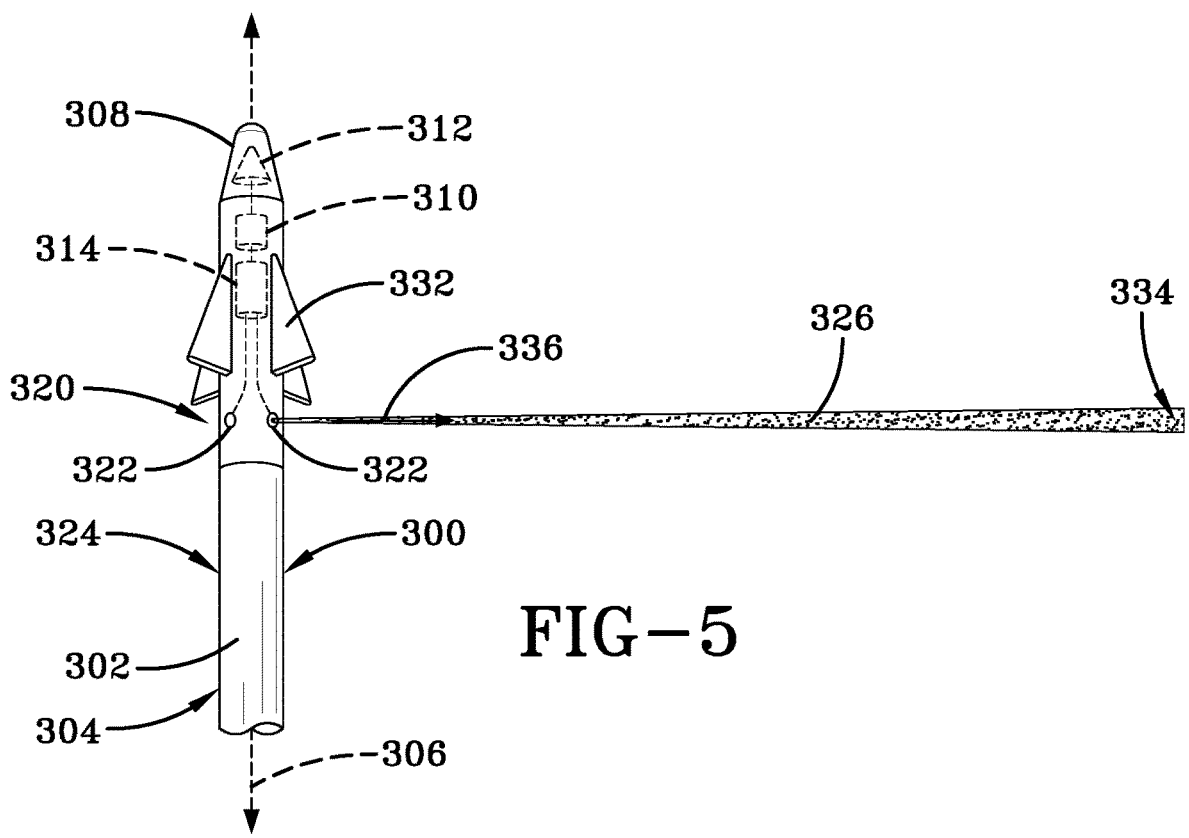
FIG. 5 is a side view of an exemplary projectile according to the invention including an exemplary detection system according to the invention.

Turning now to FIGS. 5 and 6, a projectile 300 is shown including a target detector array 320 including a plurality of target detection systems 322 according to the aforementioned description of the detection system 22. The projectile 300 depicted is a missile or rocket, although other projectiles may be suitable for use with the detection system 322. The projectile 300 includes a fuselage 302 to which a motor 304, such as a booster, is coupled for driving movement of the projectile 300 through an environment. The fuselage 302 extends longitudinally along a central longitudinal axis 306 between a forward nose cone 308 and the motor 304.

The projectile 300 includes an actionable element 310, such as a warhead initiation fuze coupled to an explosive warhead 312, coupled to the fuselage 302. A projectile controller 314 contained within the projectile 300 is configured to receive the target declaration signal from the detection system 322 and to communicate with the actionable element 310 to direct activation of the actionable element 310, such as activating the initiation fuze. In other embodiments, the projectile controller 314 may be separate from the fuselage 302, such as where the controller 314 communicates with a transmitter provided in place of the projectile controller 314 at the fuselage 302.

The plurality of detection systems 322 are positioned circumferentially about a periphery 324 of the projectile 300 and about the central longitudinal axis 306 of the projectile 300. Each of the detection systems 322 includes a laser light assembly that transmits temporally spaced fan-shaped pulses 326 of light outwardly from the respective detection system 322. In the depicted embodiment, the detection systems 322 are arranged to emit the pulses 326 in a direction 328 transverse the central longitudinal axis 306 of the projectile 300. The detection systems 322 may be otherwise arranged, such with at least one of the detection systems 322 arranged to emit the pulses 326 parallel to or in the direction of movement of the projectile 300.

In the depicted embodiment, four detection systems 322 are included, and are equally circumferentially spaced about the periphery 324 of the projectile 300, with each of the respective fan-shaped pulses 326 covering a section of about 90-degrees of space circumferentially about the periphery 324. The detection systems 322 are aligned to present each of the respective fan-shaped pulses 326 in a common plane 330 that orthogonally intersects the central longitudinal axis 306 of the projectile 300. The circumferential spacing of the detection system 322 prevents overlap of the transmitted fan-shaped light pulses 326 in space about the projectile 300. The space in which the pulses 326 do not overlap may have a diameter greater than or equal to a maximum outer diameter of the projectile 300, such as including projections 332, such as wings, fins, etc. In other embodiments, any number of detection systems 322 may be used, and may be otherwise arranged relative to one another where suitable.

The fan-shaped pulses 326 are thinner in the direction along the projectile flight path than in the common plane 330. Together, the four respective fan-shaped pulses 326 cover a full 360° circle circumferentially around the projectile. The respective detection systems 322 may be configured to extend each pulse 326 to a maximum lethality limit 334 of at least about 30 ft to about 50 ft, or about 35 ft to about 45 ft, or about 40 ft outwardly from the periphery 324 in the direction 336 orthogonal the axis 306.

Each detection system 322 also includes an optical detector that receives photonic energy of the transmitted light reflected back towards the respective detection system 322 by the environment and that converts the photonic energy to electrical energy. A charge storage architecture receives and stores the converted electrical energy, and a charge reading architecture digitizes the electrical energy stored at the charge storage architecture and transmits data regarding an energy level of the stored energy to a detector controller. A memory onboard the projectile 300, which may be a part of the detection system 322 or separate from the detection system 322, is configured to store profiles of known environmental elements. In other embodiments, the memory storing said profiles may be disposed separately from the projectile 300 with the detector controller communicating wirelessly with the off-board memory.

The detector controller is configured to receive the data from the charge reading architecture and also to direct the respective detection systems 322 to initiate light pulsing at temporally distinct intervals from others of the target detectors. Each detection system 322 preferably includes a different respective detector controller, although in some embodiments two or more detection systems 322 may share a detector controller. When the respective detector controller determines recognition of a predetermined target 354, such as depicted in FIG. 7, the detector controller outputs a target declaration signal to the projectile controller 314, thereby causing the projectile controller 314 to activate the actionable element 310, and in the case of the illustrated projectile 300, detonating the warhead 312.

During flight, the respective detector controllers may command the respective transmitter assemblies to transmit pulses 326 in a particular order. While FIG. 6 illustrates each of the transmitter assemblies firing in unison, a preferred configuration includes each of the transmitter assemblies transmitting the respective set of pulses 326 in a continued succession, or where pairs of opposed transmitter assemblies opposite one another across the axis 306 are fired in unison, with the pairs firing in continued succession. The laser pulses 326 are temporally brief, as aforedescribed, on the order of about a nanosecond or less in duration each, and thus the transit of the laser pulse 326 and the return reflection at the speed of light is much less than the time between each successive pulse 326 of a set of pulses 326.

Figure 7:
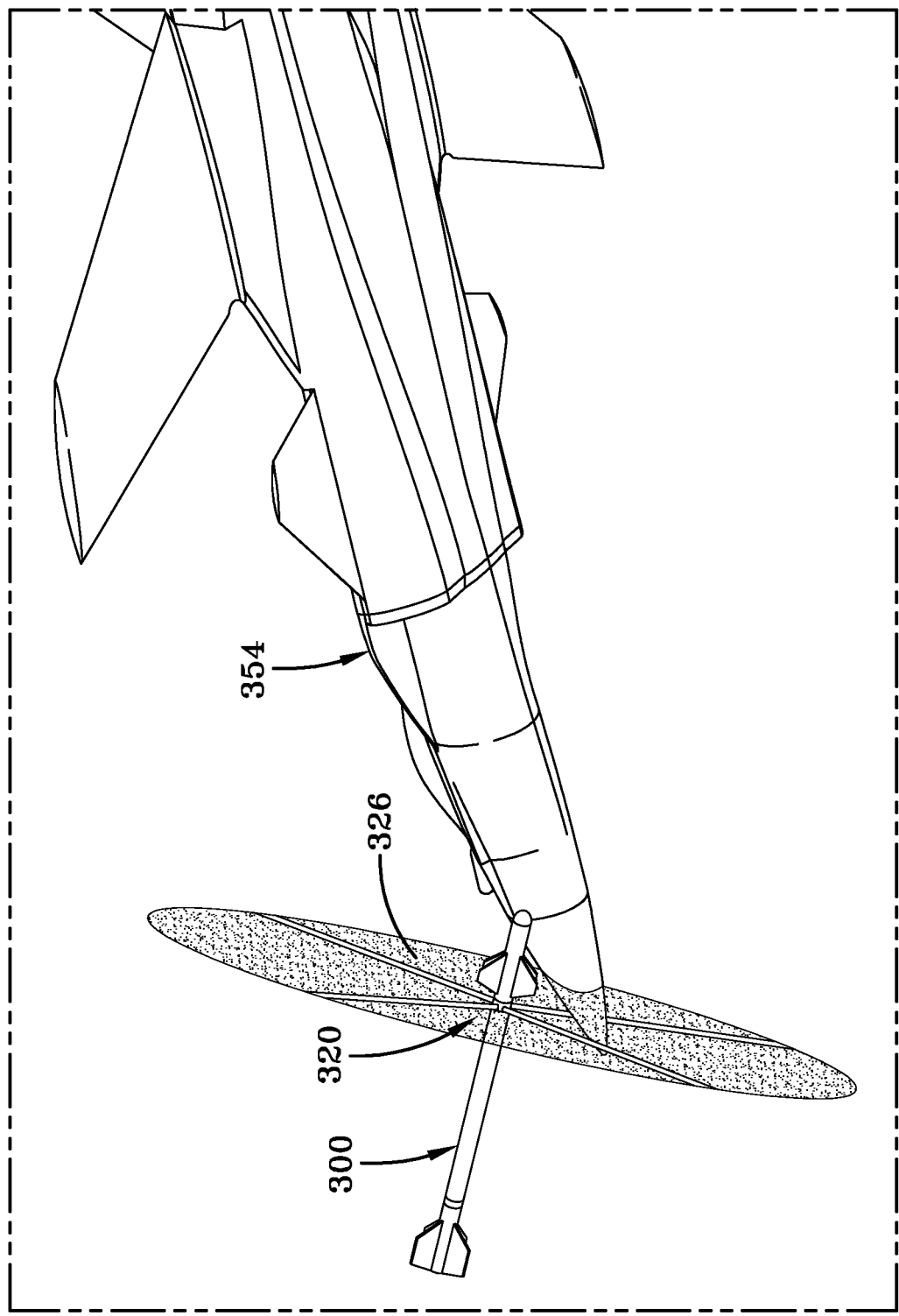
FIG. 7 is an elevated view of the projectile of FIG. 5 with the detection system engaging a target.
Figure 8:
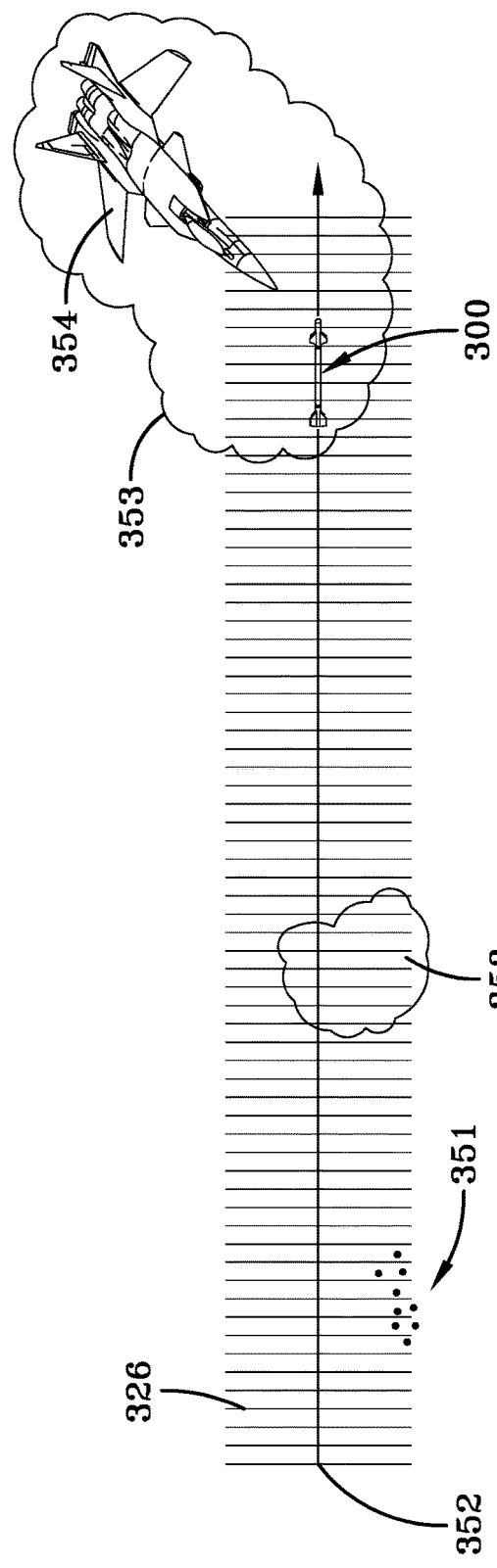
FIG. 8 is an illustration of a path of the projectile of FIG. 5 through an environment during use of the exemplary detection system.
Figure 9:
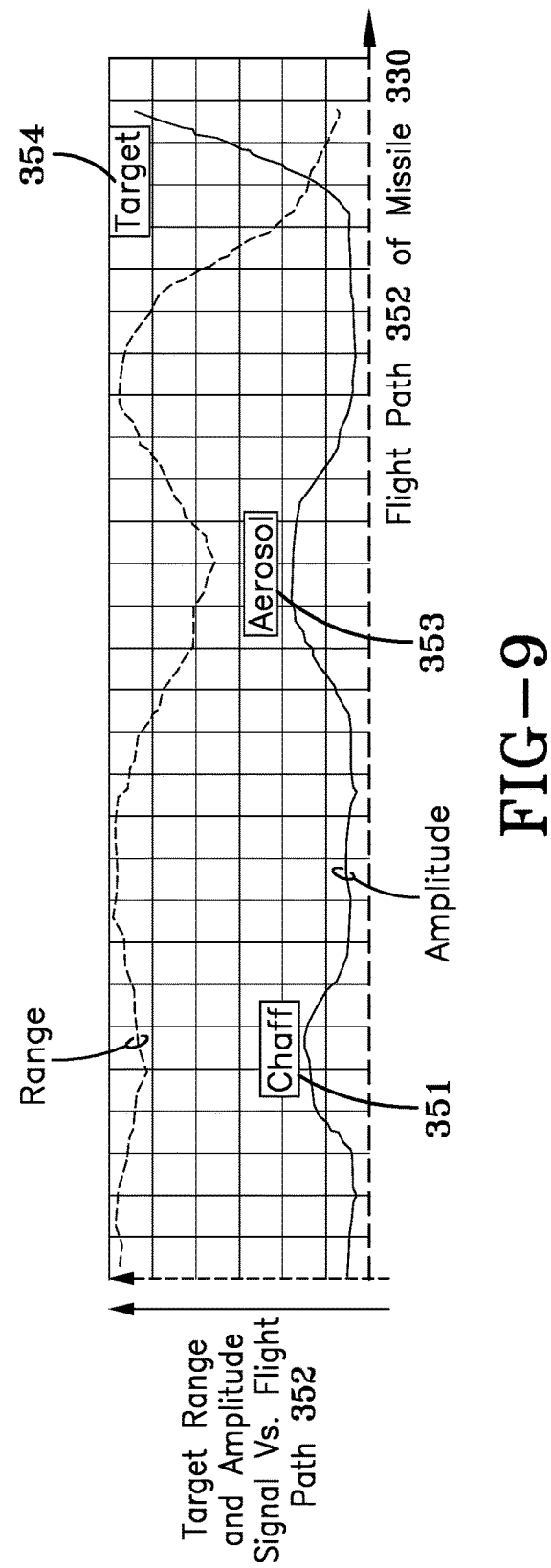
FIG. 9 is a graphical illustration of the flight path illustrated in FIG. 8.

Turning now to FIG. 8, a schematic example of a flight path 352 of a projectile 300 is depicted to illustrate a use of the projectile 300 including the detection system 322 (FIG. 7). The detection system 322 emits a plurality of pulses 326, as aforementioned, and is configured to recognize environmental elements such as chaff 351 and clouds 353 as interferrents, while also recognizing a target 354 within an interferrent cloud 353. The flight path 352 of FIG. 8 is graphically depicted in FIG. 9, with (a) the target range of the chaff 351, the aerosol clouds 353 and the target 354 from the projectile 300 and (b) the amplitude of the signals returned from the plurality of pulses 326 transmitted each graphed against the flight path 352 of the projectile 300, i.e., against a distance of the projectile 300 from a starting point zero to a position in proximity with the target 354.

In summary, and with reference to each of the aforementioned embodiments, the present disclosure provides a detection system 22, 322 that utilizes high dynamic range, monolithically arranged, digital pixel sensors 80 for situational awareness, targeting, tracking or locating. The detection system 22, 322 transmits a radially outwardly directed set of laser pulses 40, 326 into an environment, aspects of the pulses 40, 326 being reflected back by environmental elements to a single pixel array. The single pixel array scans volumetric space proximate the environment for profile characterization of the reflected aspects by the detection system 22, 322 in terms of intensity and multiplicity. The detection system 22, 322 is configured to compare this profile against a library of profiles of known environmental elements to distinguish between the environmental elements 351, 351 and a target 354. The detection system 22, 322 may be disposed about an outer periphery 324 of a projectile 300 for use in determining when the projectile 300 is proximate the target 354 for triggering an actionable element 310 of the projectile 310, such as an initiator fuze for an explosive system.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, stores, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A detection system for analyzing an environment about the detection system during movement of the detection system along a flight path through the environment, the detection system comprising:
   a laser light assembly that transmits temporally spaced pulses of light outwardly from the detection system;
   an optical detector that receives photonic energy of the transmitted light reflected back towards the detection system by the environment and that converts the photonic energy to electrical energy;
   a charge storage architecture that receives and stores the converted electrical energy;
   a charge reading architecture that digitizes the electrical energy stored at the charge storage architecture and transmits data regarding an energy level of the stored energy, wherein the electrical energy is digitized in a plurality of samples per emission of each pulse of light from the laser light assembly;
   a controller that receives digitized data from the charge reading architecture and analyzes said data, wherein the controller compiles a profile of the environment about the detection system including the measurements of the electrical energy from the analyses versus the time elements, and compares the compiled profile against predetermined profiles of environmental elements to enable recognition of the environmental elements by the detection system, and wherein the controller is configured to output a target declaration signal upon recognition of a pre-determined environmental element,
   wherein the charge reading architecture is configured to digitize each of the plurality of samples at least a factor of 10,000 times faster than the duration of an interval between signals sent by the controller to trigger subsequent emissions of light from the laser light assembly.

2. The detection system of claim 1, wherein the optical detector is a single pixel of a 1-by-1 array.

3. The detection system of claim 1, wherein at least the optical detector, the charge storage architecture, the charge reading architecture, and the controller are monolithically arranged as a single integrated component.

4. The detection system of claim 1, wherein the plurality of samples digitized per emission by the charge reading architecture is at least tens of samples per emission.

5. The detection system of claim 1, wherein the charge reading architecture is configured such that a digitization speed of each sample of the plurality of samples is less than five nanoseconds.

6. The detection system of claim 1, wherein each emission of the light transmitted by the laser light assembly is directed perpendicularly outwardly from the direction of movement in a fan-shaped pulse.

7. The detection system of claim 1, further including a memory that stores the predetermined profiles of environmental elements, the profiles including measurements of electrical energy received versus time of digitization along a respective flight path.

8. A movable projectile, comprising:
   a fuselage;
   a motor coupled to the fuselage for driving movement of the fuselage through an environment, the fuselage extending along a central longitudinal axis of the projectile;
   an actionable element for being activated upon proximity of the projectile to a target located within the environment;
   a projectile controller directing activation of the actionable element; and
   a target detector array including a plurality of detection systems according to claim 1, communicatively coupled to the projectile controller and configured to detect the target and to output a signal to cause the activation of the actionable element upon the proximity of the projectile to the target, the detection systems positioned circumferentially about a periphery of the projectile and about the central longitudinal axis of the projectile, each of the detection systems wherein the respective controller is a detector controller that is configured to output the target declaration signal upon recognition of the target being the pre-determined environmental element, to cause the projectile controller to activate the actionable element.

9. The projectile of claim 8, wherein the light transmitted by the respective laser light assemblies is directed perpendicularly outwardly from the central longitudinal axis of the projectile.

10. The projectile of claim 8, wherein the actionable element is a warhead initiation fuze coupled to a warhead that is coupled to the fuselage.

11. A movable projectile, comprising:
   a fuselage;
   a motor coupled to the fuselage for driving movement of the fuselage through an environment, the fuselage extending along a central longitudinal axis of the projectile;
   an actionable element for being activated upon proximity of the projectile to a target located within the environment;
   a projectile controller directing activation of the actionable element; and
   a target detector array including a plurality of detection systems, wherein each detection system is a detection system for analyzing an environment about the detection system during movement of the detection system along a flight path through the environment, the detection system including:
     a laser light assembly that transmits temporally spaced pulses of light outwardly from the detection system;
     an optical detector that receives photonic energy of the transmitted light reflected back towards the detection system by the environment and that converts the photonic energy to electrical energy;
     a charge storage architecture that receives and stores the converted electrical energy;
     a charge reading architecture that digitizes the electrical energy stored at the charge storage architecture and transmits data regarding an energy level of the stored energy, wherein the electrical energy is digitized in a plurality of samples per emission of each pulse of light from the laser light assembly; and
     a controller that receives digitized data from the charge reading architecture and analyzes said data, wherein the controller compiles a profile of the environment about the detection system including the measurements of the electrical energy from the analyses versus the time elements, and compares the compiled profile against predetermined profiles of environmental elements to enable recognition of the environmental elements by the detection system, and wherein the controller is configured to output a target declaration signal upon recognition of a pre-determined environmental element,
wherein the plurality of detection systems are communicatively coupled to the projectile controller and configured to detect the target and to output a signal to cause the activation of the actionable element upon the proximity of the projectile to the target, the detection systems positioned circumferentially about a periphery of the projectile and about the central longitudinal axis of the projectile, each of the detection systems wherein the respective controller is a detector controller that is configured to output the target declaration signal upon recognition of the target being the pre-determined environmental element, to cause the projectile controller to activate the actionable element,
wherein the plurality of detection systems are circumferentially positioned in an arrangement circumferentially spaced from one another to prevent overlap of the transmitted light pulses, which are fan-shaped light pulses, in a predefined space about the projectile.

12. A detection system for analyzing an environment about the detection system during movement of the detection system along a flight path through the environment, the detection system comprising:
    a laser light assembly that transmits temporally spaced pulses of light outwardly from the detection system, said pulses transiting a radial area of space during each emission period of each discrete pulse of light;
    an optical detector that receives photonic energy of the transmitted light reflected back towards the detection system by the environment and that converts the photonic energy to electrical energy;
    a charge storage architecture that receives and stores the converted electrical energy;
    a charge reading architecture that digitizes the electrical energy stored at the charge storage architecture and transmits data regarding an energy level of the stored energy, wherein the electrical energy is digitized at a rate of 30 to 50 of samples per each emission period, wherein a digitization speed of each sample of the plurality of samples is less than five nanoseconds; and
    a controller that receives digitized data from the charge reading architecture and analyzes said data to determine proximity of the detection system to a pre-determined environmental element.

13. The detection system of claim 12, wherein the controller is configured during the analysis to compare said data against a plurality of pre-defined profiles including measurements of electrical energy received versus time of digitization along a respective flight path, and wherein the controller is configured to output a target declaration signal upon recognition of the pre-determined environmental element.

14. The detection system of claim 12, wherein a digitization speed of each sample of the plurality of samples is less than two nanoseconds.

15. A detection system for analyzing an environment about the detection system during movement of the detection system along a flight path through the environment, the detection system comprising:
    a laser light assembly that transmits temporally spaced pulses of light outwardly from the detection system;
    an optical detector that receives photonic energy of the transmitted light reflected back towards the detection system by the environment and that converts the photonic energy to electrical energy;
    a charge storage architecture that receives and stores the converted electrical energy;
    a charge reading architecture that digitizes the electrical energy stored at the charge storage architecture and transmits data regarding an energy level of the stored energy, wherein the electrical energy is digitized in a plurality of samples per emission of each pulse of light from the laser light assembly;
    a controller that receives digitized data from the charge reading architecture and analyzes said data, wherein the controller compiles a profile of the environment about the detection system including the measurements of the electrical energy from the analyses versus the time elements, and compares the compiled profile against predetermined profiles of environmental elements to enable recognition of the environmental elements by the detection system, and wherein the controller is configured to output a target declaration signal upon recognition of a pre-determined environmental element,
    wherein the detection system further includes a temporal filter tuned to provide a signal in response to a change in energy level received to facilitate detection of a leading edge of the signal released from the charge storage architecture.

16. The detection system of claim 15, wherein the plurality of samples digitized per emission by the charge reading architecture is at least tens of samples per emission.

17. A detection system for analyzing an environment about the detection system during movement of the detection system along a flight path through the environment, the detection system comprising:
    a laser light assembly that transmits temporally spaced pulses of light outwardly from the detection system, said pulses transiting a radial area of space during each emission period of each discrete pulse of light;
    an optical detector that receives photonic energy of the transmitted light reflected back towards the detection system by the environment and that converts the photonic energy to electrical energy;
    a charge storage architecture that receives and stores the converted electrical energy;
    a charge reading architecture that digitizes the electrical energy stored at the charge storage architecture and transmits data regarding an energy level of the stored energy, wherein the electrical energy is digitized at a rate of a plurality of tens of samples per each emission period, wherein a digitization speed of each sample of the plurality of samples is less than five nanoseconds; and
    a controller that receives digitized data from the charge reading architecture and analyzes said data to determine proximity of the detection system to a pre-determined environmental element,
    wherein the charge reading architecture is configured to digitize each of the plurality of samples at least a factor of 10,000 times to 30,000 times faster than the duration of an interval between signals sent by the controller to trigger subsequent emissions of light from the laser light assembly.

18. The detection system of claim 17, wherein the controller is configured during the analysis to compare said data against a plurality of pre-defined profiles including measurements of electrical energy received versus time of digitization along a respective flight path, and wherein the controller is configured to output a target declaration signal upon recognition of the pre-determined environmental element.

19. A detection system for analyzing an environment about the detection system during movement of the detection system through the environment along a flight path, the detection system comprising:
   a laser light assembly that transmits temporally spaced fan-shaped pulses of light outwardly from the detection system; and
   a monolithically arranged optical circuit having a body including a single pixel of a 1-by-1 array, a charge storage well, a comparator or an A-to-D converter, and a controller, wherein the optical circuit is configured to receive photonic energy of the transmitted light reflected back towards the detection system by the environment and that converts the photonic energy to electrical energy, wherein the charge storage well receives and stores the converted electrical energy, and wherein the comparator or the A-to-D converter digitizes the electrical energy stored in the charge storage well and transmits data regarding the electrical energy level of the electrical energy received into the charge storage well; and
   wherein the controller is configured to compile a profile of the environment about the detection system including the measurements of the electrical energy from the analyses versus times of digitization along the flight path of the respective electrical energy and configured to compare the compiled profile against the predetermined profiles of environmental elements to enable recognition of the environmental elements by the detection system, and wherein the controller is configured to output a target declaration signal upon recognition of a pre-determined environmental element.

20. The detection system of claim 19, wherein the optical circuit includes a plurality of comparators each configured to provide a signal to the controller upon detection of a different electrical energy level at the energy storage well.

* * * * *